Jan. 3, 1939. G. E. ROWE 2,142,954
METHOD OF AND APPARATUS FOR FORMING HOLLOW GLASS ARTICLES
Filed April 18, 1936 2 Sheets-Sheet 1

Inventor;
George E. Rowe
O. W. Brown & Parham
Attorneys

Witness;
N. B. Thayer.

Patented Jan. 3, 1939

2,142,954

UNITED STATES PATENT OFFICE 2,142,954

METHOD OF AND APPARATUS FOR FORMING HOLLOW GLASS ARTICLES

George E. Rowe, Wethersfield, Conn., assignor to Hartford-Empire Company, Hartford, Conn., a corporation of Delaware Application April 18, 1936, Serial No. 75,156

23 Claims.  (Cl. 49—9)

This invention relates to a method of and apparatus for forming hollow glass articles and more particularly to forming such articles in a manner such that they will be substantially free from defects, due to what is known in the art as a "settle wave".

One of the most common defects in hollow glassware made by commercial processes and apparatus is what is known as a "settle wave". In certain well known commercial methods of manufacturing hollow glass articles, such as bottles, a charge of plastic glass is supplied downwardly into the open upper end of an inverted blank mold of larger capacity than the charge and having a neck ring associated with its lower end and a neck pin associated with the neck ring. Settle blowing pressure is then supplied through the upper end of the mold to pack the charge of glass into the neck ring and around the neck pin and to form a finished neck portion of glass.

Subsequent to this operation, the neck pin is withdrawn from contact with the glass and a time period provided at this stage in the process for what is known as "corkage reheat". That is, the glass which has been in contact with the neck pin is permitted time for reheating out of contact with any cooler metallic surface, the heat of the interior portions of the glass soaking through and softening the skin, which has been formed by contact with the neck pin. This has been an essential step in prior practices, due to the fact that it has been impractical to supply blowing pressure to expand the cavity started by the neck pin until the glass bounding that cavity has softened to permit the proper expansion thereof.

However, during this period of time devoted to "corkage reheat", the glass in contact with the blank mold at the sides thereof has, of course, also formed a certain amount of skin, due to heat being abstracted from the surface of the glass faster than heat can flow by conduction through the glass from the hotter central portion of the charge.

Thereafter counterblowing pressure has been supplied to expand the glass into conformity with the internal cavity of the blank mold and up against a suitable baffle. When this was done in the ordinary case, the portion of glass which was previously in contact with the sides of the mold remained substantially stationary, the hotter central portion of the glass body rolling out and contacting with the upper portions of the mold. After the parison was counterblown, some time was permitted for the glass to form a certain amount of skin, so that the parison which was thereby formed, might retain the shape imparted to it during the subsequent transfer.

As will be obvious from the above description, the portion of glass initially in contact with the mold during the entire settle blowing and counterblowing had a longer period of contact therewith than that portion which was forced into contact with the mold by the counterblowing operation, and as a result there was a thicker skin formed on the parison for the portion initially in contact with the mold during the settle blowing than the remaining portion of the parison.

This differential skin thickness was never wholly eliminated, so that the articles thus produced had walls of two materially different thicknesses, meeting at a zone around the article. This differential thickness resulted in a visible defect in the glass, which shows up as a wave band surrounding the articles, and is known in the art as a "settle wave". This "settle wave" is not only unsightly, but the differential thicknesses require more glass to provide a given strength to the article than would be required if the walls thereof were of more uniform thickness. Thus the "settle wave" has its origin to a major extent at least in the fact that the glass is in contact for a materially longer time with the mold at one portion than at another, and this difference in time of contact is augmented to an undesired extent by the necessity of providing "corkage reheat".

An object of the invention is to provide a novel method and apparatus whereby lighter and more sightly glassware may be produced by the substantial elimination of the "settle wave", and thereby both to improve the quality of the ware and reduce the cost of its manufacture.

A further object of my present invention is substantially to eliminate the "settle wave" in commercial glass articles by substantially wholly eliminating the time period heretofore devoted to "corkage reheat" and specifically to provide a novel method permitting the elimination of this corkage reheat period and novel apparatus usable in the performance of the method for attaining the desired results.

Further and more detailed objects and advantages of the present invention will be apparent from the following specification and appended claims, all when taken in connection with the accompanying drawings, in which:

While I contemplate that my invention both from a method point of view and using the same or some equivalent apparatus may be employed in conjunction with many types of machines, I have chosen to illustrate the invention using apparatus which may be used directly with a now well-known commercial machine known as the "Hartford I. S." machine and disclosed in substantially that form in the Ingle Patent No. 1,911,119, granted May 23, 1933. Reference will be made to that patent in the following description to show how the several instrumentalities shown diagrammatically herein may be superimposed bodily on the Ingle machine and operated by the various operating mechanisms thereof. Many of the forms of the invention herein disclosed have in fact been operated in conjunction with this particular machine with a marked degree of success.

*The form of the invention of Figs. 1 to 5, inclusive*

Figure 1:
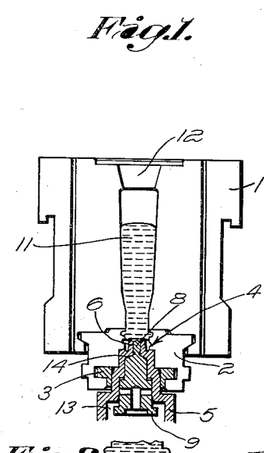
Figures 1 to 5 illustrate diagrammatically in vertical section certain apparatus and also various method steps in the forming of a glass article, such as a bottle, in accordance with the present invention, Fig. 1 showing the charging of a blank mold, Fig. 2, the settling of the charge in the blank mold, Fig. 3, the counterblowing of that charge also in the blank mold to form a parison, Fig. 4, the parison after having been transferred to a final blow mold, and Fig. 5, the completion of the formation of an article from the parison formed as aforesaid.

Referring now to Figs. 1 to 5 of the drawings, I have shown a blank mold at 1, which may correspond to the mold 1 of the machine shown in Figs. 4 and 5 of the Ingle patent. Associated with this mold in the present case is a neck ring 2, which may be of conventional form and may be constructed, mounted and operated in the same manner as the neck ring 3 of the Ingle patent, the neck ring being associated as shown with the lower end of the mold 1 and the upper end of that mold being open as illustrated in Fig. 1 of the accompanying drawings for the receipt of a charge of plastic glass supplied thereto from above by any suitable means, which may be the same as or equivalent to the means contemplated for use with the Ingle machine and disclosed in that patent.

Figure 2:
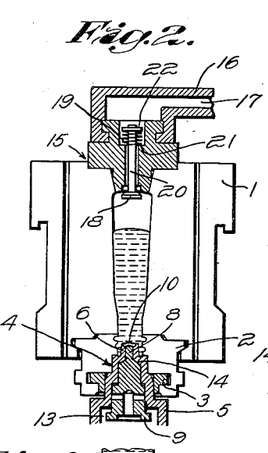
Figure 3:
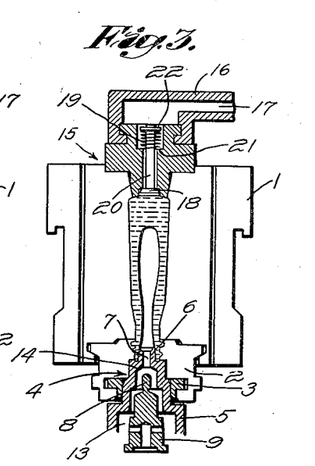

It will be noted that the neck ring 2 of Figs. 1 to 3 has associated therewith a member 3, which is formed as an annular disc received within suitable grooves in the neck ring halves and arranged to center these halves in their closed position, the flanges of the member 3 being sufficiently wide in respect to the degree of opening of the neck ring so as always to be retained in the grooves provided therefor. This structure is not found in the Ingle patent, but may be employed in the commercial machine.

Associated with the neck ring 2 is a neck pin assembly generally indicated at 4, which in the present instance comprises an outer supporting structure 5, which carries integral or rigid therewith at its upper end a neck pin 6 adapted for contact at its sides with the glass, which is forced into the neck ring to form the finish for the article. As shown, the neck pin 6 is integral with the structure 5. The neck pin 6 as shown is provided with an aperture 7 therethrough into which extends a plug portion 8 of a valve member 9, the plug portion 8 substantially filling the aperture 7 in the upper position of the member 9 shown in Figs. 1 and 2, so that the upper end of the plug portion 8 forms a part of the top or end of the neck pin 6. The upper end of the neck pin as shown in Figs. 1 to 3 is reentrant, so as to provide a small space in which air may be trapped upon the downward movement of glass into the mold, either during the charging of the mold as shown in Fig. 1 or during the settling of that charge shown in Fig. 2, thus providing a small air pocket illustrated at 10, Fig. 2, which will serve to prevent chilling contact between the end of the neck pin and the glass opposite it.

It will be noted that the parts 5 and 9 may be operated by the mechanism disclosed in the Ingle patent. For example, the member 5 shown in Figs. 1 to 3 of the accompanying drawings may be secured to the piston 138, shown in Figs. 5 and 15 of Ingle, by the same or equivalent means as the split collar members 140 of Ingle, while the member 9 of the accompanying drawings may be operated by the same or equivalent means as the piston rod 165 of Ingle (see Fig. 15 of the Ingle patent), the connection between these parts being made in any suitable manner, as for example that disclosed by Ingle.

The parts shown in Figs. 1 to 3 of the accompanying drawings may be operated as follows. Starting with the parts in the position shown in Fig. 1, that is with the members 5 and 9 elevated to their uppermost positions, a charge of glass 11 may be supplied to the mold 1 through the open upper end 12 thereof. During this period pressure may, if desired, be on in the space 13 within the member 5, but it is prevented from passing through the neck pin into the glass due to a seal between mating surfaces of the members 5 and 9 at 14.

A head generally indicated at 15 (Fig. 2) may be moved to position in association with the upper end of the mold 1, this head corresponding generally to the head 85 of Fig. 5 of the Ingle patent, except that no funnel need be used therewith in guiding a charge into the mold due to the configuration of the upper portion of the mold, as shown in Figs. 1 to 3 of the present drawings. It will be understood that the head 15 may be carried by an arm here shown at 16 and operated in the same manner as the head 85 of Ingle except that it is moved but once into contact with the mold for both the settling and the counterblowing of each article. Settle blowing pressure may be supplied through a bore 17 in the arm 16 and through a suitable bore in the head 15.

I have illustrated in the head 15, a valve member 18, which is normally urged to closed position by a compression spring 19, surrounding the stem 20 of the valve 18 and interposed between a shoulder 21 in the head 15 and a suitable washer or other detent 22 secured to the stem 20. It will be understood that the pneumatic pressure flowing through the head from the passage 17 will be effective to unseat the valve 18 against the compression of the spring 19 and to flow along the valve stem, which is loosely received in the bore in the head, past the valve 18 and into the upper end of the mold 1 to settle the glass.

During the charging and settling of the glass in the mold as disclosed in Figs. 1 and 2, the glass will engage the outer periphery of the end of the neck pin 6 and also will be forced down the sides thereof to fill the cavity within the neck ring about the neck pin. There will, however, be a small amount of air trapped in the reentrant end portion of the neck pin which will in practice prevent such contact between the glass and the end of the neck pin as would permit the formation of a skin upon the glass at that point, due to the heat abstraction from the glass in contact with the cooler neck pin. Because of this avoidance of skin formation on this glass, it is possible immediately upon the termination of the settling operation to initiate the application of counterblowing, which in the present instance is done by pressure supplied through the neck pin, all without the necessity of waiting for a predetermined period for "corkage reheat".

As shown, the member 9 is withdrawn as illustrated in Fig. 3 and counterblowing pressure, which may have been supplied to the space 13 inside the structure 5 even before this time will flow around the member 9 and through the aperture 7 to expand the glass into conformity with the internal cavity of the mold 1 and up against the head 15. Once settle blowing pressure has been cut off, the spring 19 will act to seat the valve 18, so that this valve head will form a part of the lower end of the head 15 and in effect form a continuous baffle for this end of the mold. If desired counterblowing pressure may be supplied through the aperture 7 through the neck pin for a time, the neck pin being then withdrawn and further or continued counterblowing pressure thereafter applied, but preferably I retain the neck pin in the position shown in Fig. 3 at least until the glass has been expanded into conformity with the cavity of the blank mold.

Figures 4, 5, 6, 7, 8:
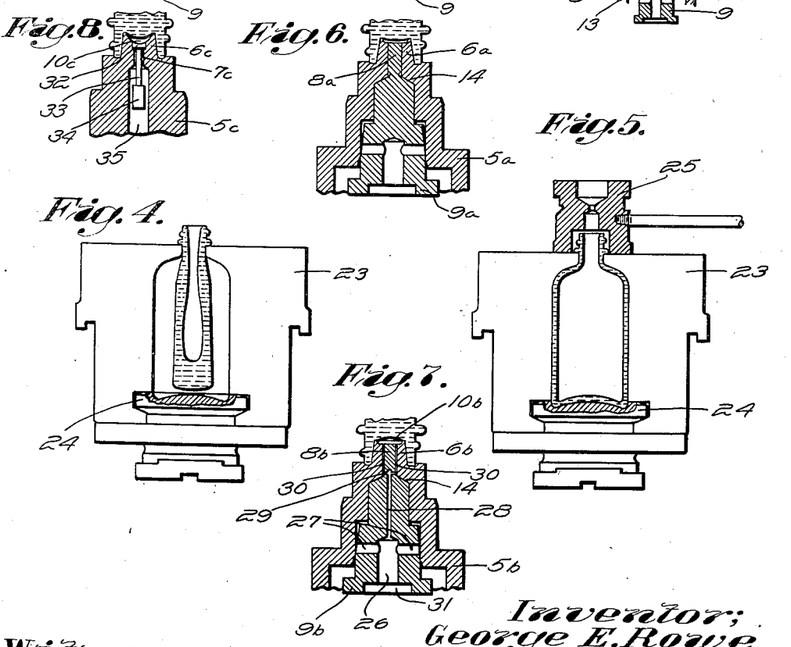
Fig. 6 illustrates in vertical section a fragmentary detail of mechanism constituting a slight modification of the mechanism shown in Figs. 1 to 3 inclusive.
Fig. 7 is a view similar to Fig. 6, but showing a further modified form of apparatus.
Fig. 8 is a view similar to Figs. 6 and 7 showing a still further modification.

Subsequent to the completion of the expansion of the glass to form a parison in the blank mold, as shown in Fig. 3, the parison may be transferred by suitable means, such for example as those disclosed by Ingle, to a final blow mold, here shown at 23, Figs. 4 and 5, which has associated therewith a bottom plate 24, the blow mold closed to support the parison as shown in Fig. 4 and final blowing pressure applied through a blow head 25 from some suitable source, all substantially as disclosed by Ingle or in any other suitable or desired manner. This completes the formation of an article according to the disclosure of Figs. 1 to 5 of the accompanying drawings.

It will be understood that while I have taught in these figures the settling of the glass by the application of pressure to the upper end of the mold, any other suitable or desired method of settling the glass may be employed, and I intend to cover by the term "settling" all such settling means and/or methods.

Further, while I have shown a neck ring and blank mold formed as separate parts for independent movement, it will be understood that under certain circumstances these molds may be formed integral as shown, for example in the patent to Ingle No. 1,843,159, granted Feb. 2, 1932, that is, a part mold and part neck ring as one integral member cooperating with a complementary integral member. It is necessary in making certain types of articles with such mold equipment, however, to provide some different method of transferring a parison to a final blow mold from that specifically disclosed by Ingle.

Also, while I have disclosed in Figs. 1 to 5 the manufacture of glass articles, such as bottles, by what is familiarly termed the "two-mold" or "blank and blow mold" process, I contemplate that my invention may be carried on using what is known as a "single mold" process, that is, where the glass upon being expanded into conformity with the initial mold into which the charge of glass is supplied is in its final desired form. Such a single mold process for example is illustrated in my copending application, Serial No. 23,296, filed May 24, 1935, now Patent No. 2,063,463, granted Dec. 8, 1936.

*Fig. 6 form of the invention*

This form of the invention is essentially similar to that previously described for Figs. 1 to 3, except that the upper end of the neck pin 6a forming a part of the member 5a, which correspond generally to the parts 5 and 6 respectively of Figs. 1 to 3, is not formed with as deep a reentrant portion, as is shown in the case of the correspondingly numbered parts in Fig. 3, and also the upper end of the plug portion 8a of the member 9a is formed flat instead of rounded as in the case of the portion 8 shown in Fig. 3. The volume of the bubble of air trapped by the glass at the end of the neck pin in this form of the invention may be substantially the same as that of the Figs. 1 to 3 form, but under certain circumstances one form or the other may be the more desirable. In this case, as in the case of the structure of Figs. 1 to 3, the seal between the members 5a and 9a is by mating beveled surface at 14. The process of making articles is substantially the same as that previously described.

*The Fig. 7 form of the invention*

This form of the invention has the parts 5b—6b formed similarly to the parts 5a—6a respectively of Fig. 6, but the part 9b including the plug portion 8b is somewhat different as is also the operation. As shown in this figure, the member 9b is provided with an enlarged longitudinal bore 26 and a lateral bore 27, in the same way as the corresponding members 9 and 9a, in which these bores are not numbered. There is, however, in prolongation of the bore 26 a small diameter bore 28 which terminates at its upper end above the mating surfaces 14 in lateral bores 29, which communicates with longitudinally extending grooves 30 formed on the sides of the plug member 8b and communicating at their upper ends with the reentrant upper end portion 10b of the neck pin 6b.

The operation in this case is slightly different from that above described in that air preferably under a low pressure may be supplied to the space 31 within the member 9b, preferably in advance of the termination of the settling operation, or even under some circumstances during the charging operation, this air flowing through the passages 26, 28, 29 and 30 to the space 10b and thus serving more positively to form a cavity in the glass at the end of the neck pin to prevent skin forming contact between the glass and neck pin at the end thereof, while contact will be had between the sides of the neck pin and the glass. At the termination of the settling operation, this pressure may be continued in the same manner for a short time, or, if desired, air under a higher pressure may be supplied through the same channels. Also, if desired, the member 9b may be withdrawn as illustrated in Fig. 3 for the member 9 and pressure supplied through the neck pin for counterblowing the glass to expand it into conformity with the internal cavity of the body mold, which it will be understood is associated with the parts specifically shown in Fig. 7 in the same manner as shown in Fig. 3.

There is illustrated in the Ingle patent, see particularly Fig. 15, passages at 152 and 160 through which pressure may be supplied to the space within the member most closely corresponding to the member 9b here shown, so that no additional operating structure need be supplied other than that disclosed by Ingle in carrying out the methods contemplated for use with the structure of Fig. 7 of the accompanying drawings.

Fig. 8 form of the invention

In Fig. 8 I have merely shown a member 5c corresponding generally to the member 5 in the form of the invention shown in Figs. 1 to 3, but having instead of the member 9 or equivalent members within it, a freely movable valve member 32, which is normally seated in a suitable recess in the end of the neck pin 6c and is arranged to close the upper end of an aperture 7c through this neck pin. Means are preferably provided for urging the valve member 32 onto its seat. In the present instance, I provide a valve stem 33, which may be integral with the valve member 32 or suitably rigidly secured thereto and which carries at its lower end a weight 34. It will be understood that any other suitable means could be provided for urging the valve member 32 onto its seat and that when seated, this valve forms a seal against the annular horizontal surface therebeneath surrounding the aperture 7c. The upper end of the neck pin 6c is formed with a reentrant portion for the trapping of air by the glass to form a cavity 10c as shown, the valve 32 also being reentrant, although this last is not essential.

During the settling of a charge of glass, the settling operation takes place as above described in connection with Figs. 1 and 2. However, subsequent to the settling operation, counterblowing pressure may be supplied through the passage 35, which will serve to force the valve member 32 off its seat against the force supplied by the weight 34, the pressure flowing through the aperture 7c along the valve stem 33 and serving to expand the glass in the manner illustrated in Fig. 3. During this time the neck pin 6c is in the position illustrated in Fig. 8, although this expansion may be continued after the withdrawal of the neck pin. As previously stated, however, I prefer that the neck pin be retained in position in contact with the glass at the sides thereof until the glass has been expanded into conformity with the internal cavity of the blank mold, although I contemplate that once this expansion has been completed to the extent shown in Fig. 3, I may withdraw the neck pin from contact with the glass while continuing pressure therethrough or therearound to hold the glass in contact with the sides of the mold and with the baffle 15 for the desired period of time prior to transferring the parison to a final blow mold for final blowing. In other respects, the process may be carried on in the same manner as above described in respect to Figs. 1 to 5.

Figs. 9 to 12 form of the invention

In these figures are shown a modification of my invention which differs from the previous forms thereof both in construction and in the manner of use. It is similar, however, in that it provides for the prevention of skin formation on the glass at the end of the neck pin and thus permits the application of counterblowing pressure to expand the glass into conformity with the initial or blank mold without the necessity of a period devoted to "corkage reheat".

As in the previous form of the invention, there is illustrated a blank mold 1 and a neck ring 2a, the neck ring, however, being as shown substantially the same as that of the Ingle patent, rather than provided with an annular centering member as shown at 3 in Figs. 1 to 3. Associated with the neck ring 2a is a nipple member 36, similar to the nipple 139 shown in Fig. 5 of the Ingle patent, both in construction and function, and is adapted to be operated in the same way. This member serves to form the outer end of the finish of the article in such manner that there will be no seams extending across this outer end.

Figures 9, 10, 12, 13, 14, 16:
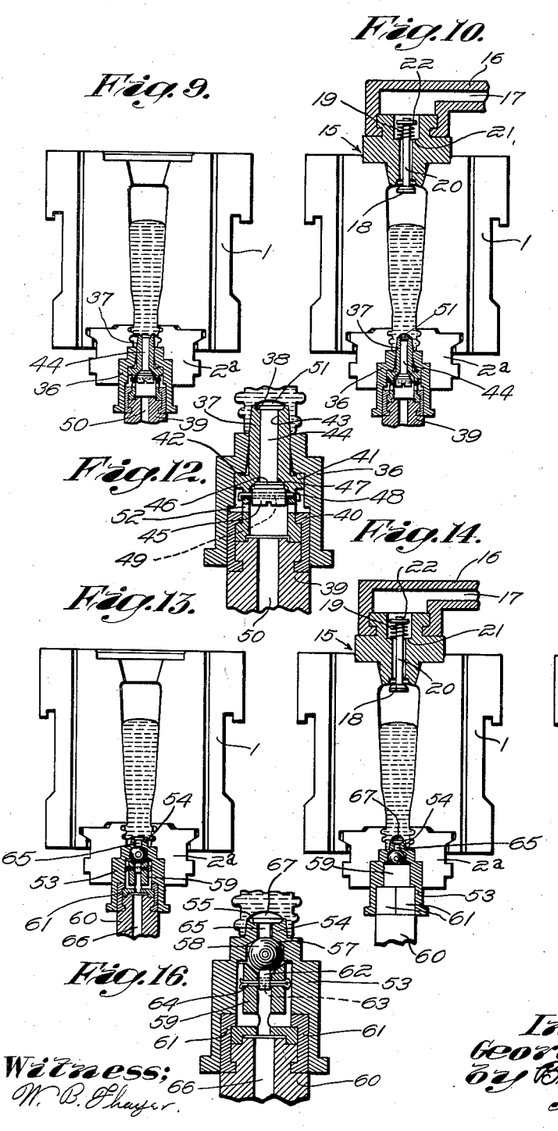
Figs. 9, 10 and 11 are similar to Figs. 1, 2 and 3 respectively, but show a further modified form of the apparatus by which the general method may be performed.
Fig. 12 is an enlarged view in vertical section of certain of the mechanism employed in Figs. 9, 10 and 11.
Figs. 13, 14 and 15 are a series of views, similar to Figs. 9, 10 and 11 respectively and showing a still further modification of my invention.
Fig. 16 is an enlarged view in vertical section illustrating certain of the mechanism employed in the form of the invention shown in Figs. 13 to 15.

Within the nipple member 36 is a neck pin 37, which has a reentrant end portion illustrated at 38, Fig. 12. The neck pin 37 is arranged to be secured to and operated by a member 39 which corresponds functionally to the piston rod 165 of the Ingle patent (see Fig. 15). The neck pin 37 is secured to the member 39 by split collar members 40 having inturned flanges engaging the respective portions and being confined in position by a downwardly extending cylindrical portion of the member 36 as shown. Here again the construction is substantially the same as in the Ingle device. At the upper position of the neck pin 37, a flange 41 thereof forms a seal at 42 against a downwardly directed shoulder portion in the member 36 and prevents flow of fluid pressure past this point.

The neck pin 37 is provided with a central longitudinal bore 43 through which extends a plug valve member 44 having a head 45 at its lower end, the upper end of the valve member 44 as shown being flush with the depressed portion 38 at the end of the neck pin. The plug member 44 preferably fits loosely in the bore 43 and flow of pressure along this plug is prevented at the upper position thereof by the engagement of the beveled surface 46 on the head 45 with a complementary beveled surface 47 within the member 37. Extending through a part of the lower skirt of the member 37 is a pin 48, which is preferably rigid with the member 37, this pin extending through a vertically elongated slot 49 in the head 45, so that the plug member 44 is permitted a slight vertical movement in respect to the member 37, this movement being determined by the height of the slot 49.

The operation of the parts in Figs. 9 to 12 is as follows. At the time a charge of glass is supplied to the mold 1, counterblowing pressure is being supplied through the bore 50 of the member 39, this pressure serving to hold the beveled surfaces 46 and 47 in engagement with one another and thereby preventing upward flow of pressure past the plug member 44. When the glass moves downward in the mold, either due to its initial movement in passing into the mold or during the settling operation, the valve is caused to move downwardly and separating the beveled surfaces 46 and 47 to permit a momentary flow of pressure past the valve and upward in the bore 43 around the plug member 44 into the upper end of the neck pin to form a cavity in the glass illustrated at 51. This action may be caused by contact of the lower end portion of the glass with the top of the valve stem or by the pressure of the air caused by the downward momentum of the glass in moving into the mold and trapping air in the reentrant end portion of the neck pin, the air being first trapped by the engagement of the glass with the peripheral part of the end of the neck pin surrounding the reentrant portion, then compressed by further downward movement of the glass and that pressure increased due to the heating of the trapped air by the glass.

As soon as pressure has formed this cavity, the glass at the end of the neck pin is forced out of contact with the upper end of the plug valve member 44 and pressure beneath the head 45 again seats the valve, engaging beveled surfaces 46 and 47 and thus cutting off further flow of pressure through the neck pin. This is the condition of the parts shown in Fig. 10 during a major portion at least of the settling operation.

It will be understood that as shown in Fig. 10, "settling" may be carried on in the same manner as previously described in connection with Fig. 2, the parts of the head 15 being given the same reference characters.

Figure 11:
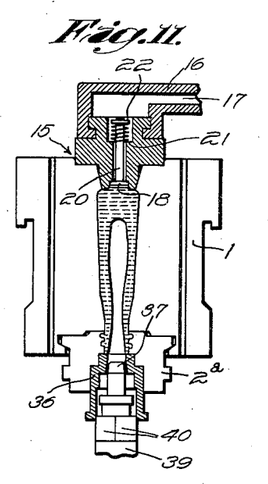

Subsequent to the settling operation as aforesaid, the neck pin 37 may be withdrawn as shown in Fig. 11 by downward movement of the member 39, so that pressure may now flow through the bore 50, thence laterally through several bores 52 in the member 37 to the space within the member 36 around the member 37, past the flange 41, which has only a loose fit with the adjacent sides of the cavity in member 36, and thence around the neck pin 37 into the mold to enlarge the cavity initially formed at 51 to expand the glass into conformity with the cavity in the mold, as shown in Fig. 11.

It will be understood that the step in the process illustrated in Fig. 11 shows the completion of the expansion of glass to form a hollow parison and that this parison may be transferred to a final blow mold, as illustrated in Fig. 4, and blown to final form, as illustrated in Fig. 5, in the manner generally described above and more specifically described, for example, in the Ingle patent.

*Figs. 13 to 16 form of the invention*

This form of the invention is similar in certain respects to that previously described and illustrated in Figs. 9 to 12 of the accompanying drawings. There is shown as previously described, a mold 1 having a neck ring 2a associated therewith and a combined settle blow head and counterblow baffle 15, which may be constructed and may operate in the same manner as the correspondingly numbered portions of previous figures.

Associated with the neck ring is a neck pin structure 53 having a neck pin 54 at its upper end. It will be understood that this structure may be suitably secured to and operated by mechanism corresponding to the piston 138 shown in Fig. 15 of the Ingle patent, which operates the nipple in that construction. The neck pin 54 is provided at its end with a reentrant portion shown at 55 and with a bore or aperture 56 extending axially therethrough, and is also provided in the interior of the structure and surrounding the aperture 56 with a valve seat 57 formed as a beveled surface. Associated with the valve seat is a ball valve member 58, which is carried by a valve carrier 59, the latter in turn being suitably secured to a plunger member 60, which corresponds functionally to the plunger member 39 of Fig. 12 and to the piston rod 165 of the Ingle patent above referred to (see Fig. 15 of Ingle). The members 59 and 60 may be suitably secured together by cooperating inwardly flanged collar members 61 as shown. The member 59 has an upwardly extending portion having an aperture centrally thereof into which extends a depending stud portion 62, which may be integral with or rigidly secured to the ball 58. Extending through the upper end part of the member 59 and through a vertically elongated slot 63 in the stud portion 62 is a suitable transverse rod or cotter pin 64. The ball member 58 thus is carried by the member 59 with provision for a slight longitudinal movement in respect thereto, this movement being limited by the dimensions of the slot 63. The ball member 58 also carries a stud 65, which projects loosely through the aperture 56 and is adapted to be actuated by the receipt of the glass in the mold 1.

The operation of the construction shown in Figs. 13 to 16 is as follows. At the time a charge of glass is supplied to the mold 1, the members 58 and 60 are in their uppermost positions as shown in Figs. 13 and 16, and the pneumatic pressure, which is normally used for counterblowing, is being supplied through the bore 66 in the member 60 and thence through various bores in the member 59 as shown to bear upon the ball member 58 and force it onto the cooperating valve seat 57, thus cutting off flow of pressure past this point. During the charging or the settling of a charge of glass, which may take place as above described in connection with the form of the invention shown in Figs. 1 to 3, the receipt of the glass will actuate the stud 65, as above set forth in describing Figs. 9 to 12, forcing the ball 58 off its seat momentarily and permitting a volume of air to flow past the ball and through the bore 56 along the stud 65. This will form a cavity in the glass as best shown at 67, Figs. 14 and 16, which will be centered by the upstanding peripheral edges of the recess or reentrant portion 55 in the neck pin, so as to provide for the accurate blowing of the glass without uneven lateral distribution of the cavity in the final article. Thereafter the pressure within the structure 53 will again seat the ball against the valve seat 57, cutting off further flow of pressure at this time.

Figure 15:
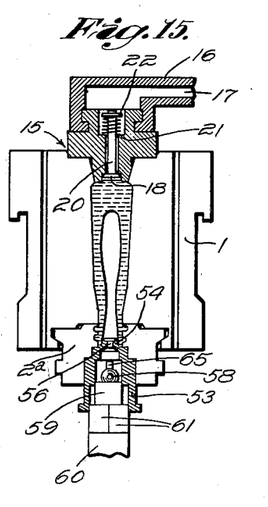

After the settling of the glass has been completed and preferably without any intervening time period for "corkage reheat" and during the time the neck pin 54 remains in contact at its sides with the glass forming the finish of the article, the member 60 is retracted downwardly as shown in Fig. 15 to retract the ball 58 and stud 65 to the position shown in this figure, whereupon continued pressure passing through the bore 66 of the member 60 and thence around the ball through the bores shown in the member 59 will flow through the aperture 56 and expand the glass into conformity with the internal cavity of the mold 1 and against the baffle member 15. Preferably after this expansion has been completed, but not necessarily after the termination of the application of counterblowing air as aforesaid, the neck pin 54 is retracted out of contact with the glass by retracting the member 53. This completes the formation of a hollow parison, or in the event that the method and mold are adapted for "single mold" operation, completes the formation of the desired article. However, if a "two-mold" method of operation is being employed, such as here illustrated, the parison may then be transferred in any suitable manner, as for example as that disclosed in the Ingle patent, to a blow mold as shown in Fig. 4, whereupon the parison may be blown to final form in any conventional manner as illustrated in Fig. 5 of the accompanying drawings.

Here again as with all the other forms of the invention, "settling" may be accomplished in any way and this term is to be construed in its broadest sense, as above set forth. Also under certain circumstances, it may be desired that the mold and neck ring may be formed as a unit rather than separately as shown in the accompanying drawings. Such a construction is also within the purview of my invention.

I have illustrated in the accompanying drawings and described hereinabove various ways in which my invention may be put into effect, both from a method and from an apparatus point of view, the apparatus illustrated being specifically one which may be employed in conjunction with the "Hartford I. S." machine, such as is shown and described in the Ingle patent aforesaid. I contemplate, however, that my invention is not to be limited to any one or more of the specific embodiments here illustrated, or to operation by a device as specifically disclosed by Ingle, but that the novel features thereof may be employed singly or in combination in any manner which will occur to those skilled in the art. I do not wish to be limited, therefore, except by the scope of the appended claims, which are to be construed as broadly as the state of the prior art permits.

I claim:

1. In the manufacture of hollow glass articles, the method which comprises the steps of supplying a charge of plastic glass to a body mold and a cooperating neck ring through the open end of the body mold, settling the charge in the body mold and neck ring and around a neck pin while preventing contact between the glass and the central portion of the end of the neck pin and thus forming a neck finish portion for the article, and expanding the glass into conformity with the internal cavity of the body mold.

2. In the manufacture of hollow glass articles, the method which comprises the steps of supplying a charge of plastic glass to a body mold and a cooperating neck ring through the open end of the body mold, settling the charge in the body mold and neck ring and around a neck pin while maintaining a pocket of air intermediate the end of the neck pin and the glass opposite it for a major part of the settling period to prevent skin-forming contact between the glass and the central portion of the end of the neck pin and thus forming a neck finish portion for the article, and expanding the glass into conformity with the internal cavity of the body mold.

3. In the manufacture of hollow glass articles, the method which comprises the steps of supplying a charge of plastic glass to a blank mold and a cooperating neck ring through the open end of the blank mold, settling the charge in the blank mold and neck ring and around a neck pin while preventing contact between the glass and the central portion of the end of the neck pin and thus forming a neck finish portion for the article, supplying air through the neck pin for at least initiating the formation of a cavity in the glass in alignment with the neck pin before withdrawing the latter from contact with the glass at the sides thereof, and completing the expansion of the glass into conformity with the internal cavity of the blank mold and thus forming a hollow parison.

4. In the manufacture of hollow glass articles, the method which comprises the steps of supplying a charge of plastic glass to a body mold and a cooperating neck ring through the open end of the body mold, settling the charge in the body mold and neck ring and around a neck pin while preventing skin-forming contact between the glass and the central portion of the end of the neck pin by trapping a limited amount of air in a reentrant portion of the neck pin at the end thereof to prevent contact between the glass and such reentrant portion of the neck pin and thus forming a finished neck portion for the article, and thereafter expanding the glass into conformity with the internal cavity of the body mold.

5. In the manufacture of hollow glass articles, the method which comprises the steps of supplying a charge of plastic glass to a body mold and a cooperating neck ring through the open end of the body mold, settling the charge in the body mold and neck ring and around a neck pin while preventing skin-forming contact between the glass and the central portion of the end of the neck pin by trapping a volume of air in a reentrant end portion of the neck pin to prevent contact of glass with such reentrant portion and thus forming a neck finish portion for the article, and admitting counterblowing pressure through the neck pin into the reentrant portion thereof to expand the glass to conformity with the internal cavity of the body mold while still maintaining the neck pin in contact at its sides with the interior of the finish portion of the article.

6. In the manufacture of hollow glass articles, the method which comprises the steps of supplying a charge of plastic glass to a body mold and a cooperating neck ring through the open end of the body mold, settling the charge in the body mold and neck ring and around a neck pin while preventing skin-forming contact between the glass and the central portion of the end of the neck pin and thus forming a neck finish portion for the article, admitting counterblowing pressure to the interior of the neck pin structure during the time settling of the charge is taking place as aforesaid, and initially establishing communication between the interior of the neck pin structure and the end of the neck pin for the admission of counterblowing pressure through the neck pin to expand the glass into conformity with the internal cavity of the body mold by relatively moving parts of the neck pin structure to provide a passage through the neck pin.

7. In the manufacture of hollow glass articles, the method which comprises the steps of supplying a charge of plastic glass to a blank mold and a cooperating neck ring through the open end of the blank mold, settling the charge in the blank mold and neck ring and around a neck pin by applying settle blowing pressure to the interior of the mold through the end thereof through which the charge was introduced thereinto while preventing skin-forming contact between the glass and the central portion of the end of the neck pin by trapping a volume of air in a reentrant portion at the end of the neck pin and thus forming a neck finish portion for the article, admitting counterblowing pressure to the interior of the neck pin structure during the time settle blowing pressure is being maintained in the blank mold as aforesaid, and moving the central portion of the neck pin structure to provide an opening through the neck pin between the interior of the structure thereof and the reentrant portion at the end thereof for the passage of counterblowing pressure to expand the glass into conformity with the internal cavity of the blank mold and thereby to form a hollow parison.

8. In the manufacture of hollow glass articles, the method which comprises the steps of supplying a charge of plastic glass to a body mold and a cooperating neck ring through the open end of the body mold, settling the charge in the body mold and neck ring and around a neck pin and thus forming a neck finish portion for the article, maintaining blowing air under pressure within the neck pin structure during a part at least of the settling period, causing contact between the glass and a movable valve portion in the neck pin to open the valve momentarily and thereby to admit a puff of air from the interior of the neck pin structure to create a cavity in the glass opposite the end of the neck pin to prevent skin-forming contact during the settling operation between the glass and the central portion of the end of the neck pin, and thereafter expanding the glass into conformity with the internal cavity of the body mold.

9. In the manufacture of hollow glass articles, the method which comprises the steps of supplying a charge of plastic glass to a body mold and a cooperating neck ring through the open end of the body mold, settling the charge in the body mold and neck ring and around a neck pin and thus forming a neck finish portion for the article, maintaining counterblowing air under pressure within the neck pin structure during at least a part of the settling period, causing contact between the glass and a movable valve portion in the neck pin to open the valve momentarily and thereby to admit a puff of air through the neck pin to create a cavity in the glass opposite the end of the neck pin and thereby to prevent skin-forming contact during the settling operation between the glass and the central portion of the end of the neck pin, and supplying counterblowing pressure to expand the glass into conformity with the internal cavity of the body mold starting immediately upon the termination of the settling operation as aforesaid.

10. In the manufacture of hollow glass articles, the method which comprises the steps of supplying a charge of plastic glass to a body mold and a cooperating neck ring through the open end of the body mold, settling the charge in the body mold and neck ring and around a neck pin and thus forming a neck finish portion for the article, maintaining counterblowing air under pressure within the neck pin structure during the settling period, causing contact between the glass and a movable valve portion in the neck pin to open the valve momentarily and thereby to admit a puff of air through the neck pin to create a cavity in the glass opposite the end of the neck pin and thereby to prevent skin-forming contact during the settling operation between the glass and the central portion of the end of the neck pin, and thereafter opening the valve in the neck pin to admit counterblowing pressure therethrough to enlarge said cavity and expand the glass into conformity with the internal cavity of the body mold.

11. In the manufacture of hollow glass articles, the method which comprises the steps of supplying a charge of plastic glass to a blank mold and a cooperating neck ring through the open end of the blank mold, applying a combined settle blow head and counterblow baffle to the open end of the mold, supplying air through said head for settling of charge in the blank mold and neck ring and around a neck pin and thus forming a neck finish portion for the article, maintaining counterblowing air under pressure within the neck pin structure during the charging and settle blowing period, causing contact at some time prior to the cessation of the application of settle blowing pressure between the glass and a movable valve portion in the neck pin to open the valve momentarily and thereby to admit a puff of air from the interior of the neck pin structure to create a cavity in the glass opposite the end of the neck pin to prevent skin-forming contact during the settling operation between the glass and the central portion of the end of the neck pin, and positively opening the valve in the neck pin to admit counterblowing pressure therethrough for expanding the glass into conformity with the internal cavity of the blank mold and against the counterblow baffle associated therewith immediately upon the termination of the application of settle blowing pressure and thereby forming a hollow parison.

12. In the manufacture of hollow glass articles, the method which comprises the steps of supplying a charge of plastic glass to a body mold and a cooperating neck ring through the open end of the body mold, settling the charge in the body mold and neck ring and around a reentrant ended neck pin while preventing skin-forming contact between the glass and the reentrant portion of the end of the neck pin by trapping air in the reentrant end of the neck pin and thus forming a neck finish portion for the article, and supplying counterblowing pressure through the neck pin to expand the glass into conformity with the internal cavity of the body mold while the neck pin remains in contact at its sides with the glass of the finish of the article until the glass has been expanded into conformity with the cavity of the body mold as aforesaid.

13. Apparatus for forming hollow glass articles, comprising a body mold adapted to be supplied with plastic glass through an open end thereof, a neck ring associated with the opposite end of said body mold, a neck pin associated with said neck ring and having its end reentrant to form a boundary for a volume of air intermediate the end of the neck pin and a charge of glass supplied to and being settled in the body mold, and settling means associated with said mold and neck ring, the parts being so constructed and arranged that during the settling operation skin-forming contact between the glass and the central portion of the end of the neck pin may be prevented by trapping a small volume of air between the glass and the reentrant end of the neck pin so that expansion of the glass into conformity with the cavity of the body mold may be initiated immediately upon the termination of the settling operation.

14. Apparatus for forming hollow glass articles, comprising a body mold adapted to be supplied with plastic glass through an open end thereof, a neck ring associated with the opposite end of said body mold, a neck pin associated with said neck ring and having the end thereof reentrant so as to form a boundary for a volume of air intermediate the end of the neck pin and a charge of glass supplied to and being settled in the body mold, settling means associated with said mold and neck ring, a valve portion in said neck pin adapted to be opened to admit counterblowing pressure therethrough at least to initiate the formation of the cavity in the glass at the end of the neck pin, and means to conduct counterblowing pressure to the cavity to expand the glass into conformity with the internal configuration of the body mold at the termination of the settling operation, the aforesaid parts being so constructed and arranged that a volume of air will be trapped to form an initial cavity in the glass at the end of the neck pin preventing skin-forming contact between such glass and the central portion of the end of the neck pin and thereby permitting initiation of the expansion of the glass immediately upon the termination of the settling operation.

15. Apparatus for forming hollow glass articles, comprising a body mold adapted to be supplied with plastic glass through an open end thereof, a neck ring associated with the opposite end of said body mold, a neck pin associated with said neck ring and having its end reentrant to form a boundary for a volume of air intermediate the end of the neck pin and a charge of glass supplied to and being settled in the body mold to prevent skin-forming contact between the glass and the reentrant portion of the end of the neck pin, settling means associated with said mold and neck ring, and means for conducting counterblowing pressure through the neck pin immediately upon the termination of the settling operation for expanding the glass into conformity with the internal cavity of the body mold while the neck pin remains in contact at its sides with the glass of the finish portion of the article in said neck ring.

16. Apparatus for forming hollow glass articles, comprising a body mold adapted to be supplied with plastic glass through an open end thereof, a neck ring associated with the opposite end of said body mold, a neck pin associated with said neck ring and having a portion at least of the end thereof reentrant so as to form a boundary of a volume of air trapped intermediate the reentrant end portion of the neck pin and the glass by the movement of a charge of glass supplied to said body mold toward said neck ring, said trapped air serving to prevent skin-forming contact between the glass and the reentrant portion of the end of said neck pin, settling means associated with said mold and neck ring, and a valve member mounted in said neck pin and movable substantially axially thereof, the parts being so constructed and arranged that at the termination of the settling operation, the valve member may be retracted to provide an opening through said neck pin through which counterblowing pressure may be introduced to enlarge the cavity formed by the trapped air in the glass opposite the reentrant portion of said neck pin and to expand the glass into conformity with the internal cavity of said body mold.

17. Apparatus for forming hollow glass articles, comprising a body mold adapted to be supplied with plastic glass through the open upper end thereof, a neck ring associated with the lower end of said body mold, a neck pin associated with said neck ring and having the end thereof reentrant to form a boundary for a volume of air trapped between the upper reentrant end of the neck pin and a charge of glass supplied to said body mold to prevent skin-forming contact between the glass and the reentrant portion of the end of the neck pin, settling means associated with said mold and neck ring, and a weighted valve in said neck pin so constructed and arranged as normally to be held in closed position by the weight associated therewith, but to be opened to permit flow of counterblowing pressure through said neck pin by such pressure when it is supplied for enlarging the cavity formed by the trapped air at the upper end of the neck pin.

18. Apparatus for forming hollow glass articles, comprising a body mold adapted to be supplied with plastic glass through an open end thereof, a neck ring associated with the opposite end of said body mold, a neck pin associated with said neck ring, settling means associated with said mold and neck ring, a structure supporting said neck pin and providing a cavity to which counterblowing pressure is adapted to be supplied in advance of the termination of the settling operation, an aperture communicating between said cavity and the end of said neck pin, a valve within said structure controlling flow of pressure through said aperture, and means extending through said aperture and arranged to be actuated by the receipt of the glass for momentarily opening said valve to admit a volume of air through said neck pin to form a cavity in the glass at the end thereof for preventing skin-forming contact between the glass and the central portion of the end of said neck pin.

19. Apparatus for forming hollow glass articles, comprising a body mold adapted to be supplied with plastic glass through an open end thereof, a neck ring associated with the opposite end of said body mold, a neck pin associated with said neck ring, settling means associated with said mold and neck ring, a structure supporting said neck ring and providing a cavity to which counterblowing pressure is adapted to be supplied in advance of the termination of the settling operation, an aperture communicating between the said cavity and the end of said neck pin in contact with the glass, a valve within said structure controlling flow of pressure through said aperture, means extending through said aperture and arranged to be actuated by the receipt of the glass for momentarily opening said valve to admit a volume of air through said neck pin to form a cavity in the glass at the end thereof for preventing skin-forming contact between the glass and the central portion of the end of said neck pin, and a reentrant portion formed in the end of said neck pin surrounding said aperture for centering the bubble of air forming the cavity in the glass at the end thereof.

20. Apparatus for forming hollow glass articles, comprising a body mold adapted to be supplied with plastic glass through an open end thereof, a neck ring associated with the opposite end of said body mold, a neck pin associated with said neck ring and having an aperture therethrough substantially axially thereof, a structure supporting said neck pin and providing a cavity to which counterblowing pressure is adapted to be supplied in advance of the termination of the settling operation, a valve seat formed in said structure surrounding said aperture and spaced from the end of said neck pin which is adapted to project into the glass, a valve member within said structure cooperating with said seat and having a stem projecting loosely through said aperture to be actuated by the receipt of the glass, means mounting said valve member for a limited movement longitudinally of said neck pin, and means for settling the glass in said mold and neck ring, the parts being so constructed and arranged that counterblowing pressure supplied within said structure will serve to force said valve member onto said seat, the valve later being unseated by contact of the glass with the stem thereof to permit pressure to flow past the valve and along the valve stem to form a cavity in the glass at the end of said neck pin, forcing the glass away from said valve stem and permitting the counterblowing pressure within said structure again to seat said valve.

21. Apparatus for forming hollow glass articles, comprising a body mold adapted to be supplied with plastic glass through an open end thereof, a neck ring associated with the opposite end of said body mold, a neck pin associated with said neck ring and having an aperture extending longitudinally therethrough, a structure supporting said neck pin and providing a cavity to which counterblowing pressure is adapted to be supplied in advance of the termination of the settling operation, a valve seat forming a partial boundary of said cavity around said aperture, a valve supporting means relatively movable in respect to said neck pin and said structure, a ball valve member carried by said valve supporting means and mounted for limited movement in respect thereto longitudinally of said neck ring structure and arranged to engage said seat in one position of the neck pin structure, a valve stem rigid with said ball valve member and extending loosely through said aperture for contact with the glass at the end of said neck pin, and means for settling glass in said mold and neck ring, the parts being so constructed and arranged that counterblowing pressure supplied within the cavity of the neck pin structure during the charging and settling of the glass in the mold will force said ball valve member onto its seat, the receipt of the glass in the mold and around the neck pin will serve to unseat said valve to permit a limited amount of pressure to flow through said aperture around said stem to form a cavity in the glass at the end of the neck pin and prevent skin-forming contact between the glass and the central portion of the end of the neck pin and also force the glass away from said stem to permit the counterblowing pressure within said cavity of the neck pin structure again to seat said valve, and retraction of the valve carrying member will retract said ball valve and its stem to provide a relatively large opening through said neck pin through which counterblowing pressure may flow to expand the glass into conformity with the internal cavity of said body mold.

22. Apparatus for forming hollow glass articles, comprising a blank mold adapted to be supplied with plastic glass through an open end thereof, a neck ring associated with the opposite end of said blank mold, a neck pin associated with said neck ring and having an aperture therethrough, a structure supporting said neck pin and providing a cavity to which counterblowing pressure is adapted to be supplied in advance of the termination of the settling operation, a valve arranged within said structure and adapted normally to be held closed by the counterblowing pressure supplied within said structure, a valve stem associated with said valve and arranged to be moved by the receipt of the glass in the blank mold to unseat said valve momentarily and permit pressure to flow through said aperture around the valve stem to provide a cavity in the glass at the end of the neck pin, and means for settling the glass in the mold and neck ring, said valve and neck pin being relatively movable to permit counterblowing pressure to flow freely through said neck pin to expand the glass into conformity with the cavity of said blank mold and thereby to form a hollow parison.

23. In the manufacture of hollow glass articles, the method which comprises the steps of supplying a charge of plastic glass to a body mold and a cooperating neck ring and neck pin through the end of the body mold opposite the neck ring, forming in the glass of the charge a cavity opposite the end of the neck pin by the introduction of a gaseous fluid under pressure through the neck pin to prevent skin-forming contact between the glass and the central portion of the end of the neck pin, thereafter forcing the glass longitudinally of the body mold to fill the cavity in the neck ring around the neck pin by differential pressure applied to the opposite ends of the glass charge while retaining in the cavity in the glass opposite the end of the neck pin formed as aforesaid gaseous medium under sufficient pressure to prevent the collapse thereof, and thereafter applying further pressure to the interior of the glass body to expand it into conformity with the internal configuration of the body mold.

GEORGE E. ROWE.